United States Patent
McMillan et al.

(10) Patent No.: US 6,506,524 B1
(45) Date of Patent: Jan. 14, 2003

(54) ELECTROLYTE COMPRISING FLUORO-ETHYLENE CARBONATE AND PROPYLENE CARBONATE, FOR ALKALI METAL-ION SECONDARY BATTERY

(75) Inventors: Roderick S. McMillan, Gloucester (CA); Denis James Worsfold, Gloucester (CA); John J. Murray, Gloucester (CA); Isobel Davidson, Gloucester (CA); Zhi Xin Shu, London (GB)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/269,267

(22) PCT Filed: Oct. 1, 1997

(86) PCT No.: PCT/CA97/00710

§ 371 (c)(1),
(2), (4) Date: May 19, 1999

(87) PCT Pub. No.: WO98/15024

PCT Pub. Date: Apr. 9, 1998

(51) Int. Cl.[7] .................................. H01M 6/14
(52) U.S. Cl. ......................... 429/324; 429/331
(58) Field of Search .................. 429/231.95, 217, 429/324, 331

(56) References Cited

U.S. PATENT DOCUMENTS 5,529,859 A * 6/1996 Shu et al. .................. 429/194
6,274,273 B1 * 8/2001 Cho et al. ............... 429/231.95

* cited by examiner

Primary Examiner—Patrick Ryan
Assistant Examiner—M. Wills
(74) Attorney, Agent, or Firm—J. Wayne Anderson

(57) ABSTRACT

The invention disclosed is an alkali metal-ion secondary cell having a carbonaceous anode and an electrolyte, comprising an alkali metal salt dissolved in an organic electrolyte solvent. Intercalation and de-intercalation during repeated charge/discharge cycle of the secondary cell using a conventional electrolyte solvent causes continual exposure of bare surfaces of the carbonaceous material to the electrolyte, resulting in continual consumption of electrolyte in the formation of new passivation films on the bared or partially covered surfaces, adversely affecting the performance and capacity of the cell. An improvement on the conventional electrolyte involves the addition of fluorinated organic solvent to the conventional electrolyte and results in a more stable passivation film, much less consumption of electrolyte and better performance and cell capacity. The cell efficiency of the secondary cell is improved substantially and high capacity retained by the replacement of the chlorinated organic solvent with fluorinated organic solvent.

22 Claims, 9 Drawing Sheets

ELECTROLYTE COMPRISING FLUOROETHYLENE CARBONATE AND PROPYLENE CARBONATE, FOR ALKALI METAL-ION SECONDARY BATTERY

FIELD OF THE INVENTION

The present invention relates to secondary cells and, in particular, to an electrolyte for alkali metal-ion secondary cells.

BACKGROUND OF THE INVENTION

Concerns about the impact of the disposal of batteries on the environment have led to the development and improvement of rechargeable cells, also referred to as secondary cells by those skilled in the art. Non-aqueous alkali metal secondary cells typically include an anode of an alkali metal, such as lithium, potassium, or sodium, an electrolyte prepared from an alkali metal salt dissolved in an organic solvent, and a cathode of an electrochemically active material, typically a chalcogenide of a transition metal. During discharge, alkali metal-ions from the anode pass through the electrolyte to the cathode where the ions are taken up with a simultaneous release of electrical energy. During charging, the flow of ions is reversed so that alkali metal-ions pass from the cathode through the electrolyte and are plated on the anode. During each discharge/charge cycle, small amounts of the alkali metal and electrolyte are consumed by chemical reactions on newly created surfaces on the alkali metal of the anode. This reaction condition is further aggravated by the tendency of the alkali metal to form dendrites as it is plated back onto the anode. The dendrites continue to grow until they eventually contact the cathode, thereby causing the cell to fail. Furthermore, the alkali metal may not cohesively plate onto the anode during the charge cycle, resulting in the formation of spongy deposits near the surface of the anode. The spongy deposits are not in electrically conductive contact with the anode and eventually may adversely affect the capacity of the cell. This consumption of the alkali metal may be minimized by providing a sheet-like microporous separator on the surface of the alkali metal and by applying substantial pressure on the separator and the anode, so that the alkali metal is deposited on the anode in the form of a layer, thereby preventing the growth of dendrites and spongy deposits. Typically, pressure is applied as an interelectrode pressure, also referred to by those skilled in the art as "stack pressure". However, only cells with cylindrical symmetry are capable of withstanding the stack pressure with a thin metal casing. Rectangular and coin-shaped cells would require very thick metal casings in order to withstand the stack pressure without excessive flexing. However, the cell would then be significantly larger and more expensive to produce. Furthermore, microporous separators which are capable of preventing dendritic penetration and withstanding the applied slack pressure are typically very expensive. However, there is still a risk that the microporous separator will be punctured by dendritic growth. As a result, long recharge times are required to reduce the risk of puncture. Unfortunately the risk of puncture increases with repeated charging even on low rates, thereby limiting the number of discharge/charge cycles which may be obtained during the life of the cell. Even when a microporous separator and the appropriate stack pressure are used, a small percentage of the alkali metal is still consumed during each discharge/charge cycle. Thus in order to obtain a sufficiently long cycle life an excess of the alkali metal is required in the cell, thereby significantly increasing the cost and size of the cell. Moreover, alkali metals are extremely reactive and have low melting points. Accordingly, excess heat generated during extended operation, especially in relatively large cells, may lead to melting of the anode. Such melting may not only render the cell inoperative, but could also lead to an undesirable reaction between the alkali metal and electrolyte and to direct contact between the molten alkali metal and the electrochemically active material of the cathode, resulting in a vigorous reaction that could rupture the cell casing.

Thus, there is a need for a secondary cell which will provide the advantages provided by an alkali metal anode, but which will not have the drawbacks associated with this type of cell. One approach has been to replace the alkali metal anode with a carbonaceous anode formed by a carbonaceous material intercalated with alkali metal-ions to form compounds of the formula $M_xC$, wherein M represents an alkali metal. In operation of the cell, alkali metal-ions pass from the intercalated carbonaceous material through the electrolyte to the cathode. When the cell is recharged, the alkali metal-ions are transferred back to the anode for re-intercalation with the carbonaceous material, thereby preventing the formation of dendrites or spongy deposits. Furthermore, melting of the anode cannot occur, even under extended periods of operation, because the alkali metal of the anode is not in a metallic form.

Suitable carbonaceous materials include graphite, coke, carbon fibre, pyrolytic carbon, non-graphitizable carbon and chemically modified carbon. Different forms of carbonaceous material which are at least partially crystalline can be characterized by their respective degrees of graphitization. The term "degree of graphitization" refers to the value g according to the formula:

$$g=(3.45-d_{002})/0.085$$

wherein $d_{002}$ represents the spacing (A) between the graphitic layers of the carbonaceous material in the crystal structure, determined by standard X-ray diffraction techniques, and g represents a dimensionless number with a value between 0 and 1.0. In general, carbonaceous material having a high degree of graphitization, for example graphite, has a more ordered microstructure, whereas carbonaceous material having a low degree of graphitization, for example coke, has a less ordered microstructure. A high degree of graphitization in the carbonaceous material of the anode provides a higher cell capacity in conjunction with less variation of cell voltage.

The voltage profile, reversibility and final stoichiometry of the alkali metal-intercalated carbonaceous material is dependent on the structure of the carbonaceous material. For example, petroleum coke has a turbostratic structure, shows a steep voltage profile, and intercalates up to a stoichiometry of $Li_{0.5}C_6$. On the other hand, graphite has a nearly perfect layered structure and is able to intercalate up to a stoichiometry of $LiC_6$, with a flat voltage curve near zero volts relative to lithium. The theoretical capacity of a graphite anode is 372 mAh/g based on the stoichiometry of $LiC_6$, thereby making graphite one of the most desirable candidates for a carbonaceous anode material (Shu, Z. X. et al "Electrochemical Intercalation of Lithium into Graphite" J Electrochem Soc 140: 4: 922–927; 1993). Highly graphitic carbonaceous materials such as graphite are inexpensive, non-toxic and are capable of incorporation into secondary cells having relatively high specific capacities. Canadian Patent Number 1,265,580 (Yoshino, A. et al. Feb. 6, 1990)

discloses a secondary cell wherein the anode ions may be intercalated reversibly and the cathode is made of an active material consisting of a sulphide or an oxide of a transition metal.

However, there are numerous problems associated with the use of a carbonaceous anode. In particular, compounds of the formula $M_xC$ are reactive materials which are difficult to handle in air. Accordingly, the anode is preferably produced in situ in a cell by an initial intercalation step. However, some of the alkali metal-ions and the electrolyte are consumed in an irreversible reaction in the initial intercalation step. This irreversible reaction results in an initial capacity loss for the cell which reduces the overall performance thereof. Without being bound by theory, it is believed by those skilled in the art that the reaction which occurs during the initial intercalation step involves the formation of a passivation film on the bare surfaces of the carbonaceous material by decomposition of electrolyte salt and/or solvent. The ideal passivation film is insoluble in the electrolyte and is an electronic insulator and an ionic conductor for alkali metal-ions and thus protects the electrolyte from decomposition on bare carbonaceous material surfaces. However, while the passivation film is being formed, additional bare surfaces of the carbonaceous material can be exposed to electrolyte. This is believed by some (for example, Wilkinson, D. P. et al, U.S. Pat. No. 5,130,211 issued Jul. 14, 1992) to occur by co-intercalation of electrolyte solvent leading to exfoliation and thus an increase in the surface area of the carbonaceous material.

It is believed that bare surfaces can also be exposed by at least two other methods. Firstly, the passivation film may be ruptured by the formation of gaseous products arising from the reduction of electrolyte solvent by intercalated carbonaceous material (Shu, Z. X. et al "Effect of 12 Crown 4 on the Electrochemical Intercalation of Lithium into Graphite" J. Electrochem. Soc 140: 6: L101–L103; 1993) and secondly, by changing the layer spacing of the carbonaceous material, in particular graphite, as alkali metal-ions intercalate therein. This change in the layer spacing can rupture the passivation film exposing bare surfaces on the carbonaceous material. Layer spacing changes can also occur during alkali metal-ion de-intercalation from carbonaceous material resulting in further passivation film rupture, bare surface exposure and the formation of a new passivation film on the resultant bared or partially covered surfaces.

Regardless of whether electrolyte solvent is co-intercalated, gaseous products are formed or the layer spacing is changed, intercalation and de-intercalation of alkali metal-ions cause continual exposure of bare surfaces to electrolyte, thereby resulting in continual consumption of electrolyte in the formation of new passivation films. Thus, the passivation film is not stable to repeated intercalation and de-intercalation of alkali metal-ions into the carbonaceous material during charge/discharge cycles so that concomitant electrolyte consumption and passivation film growth occurs. If this process continues unabated, then, with repeated cell discharge/charge cycles, the internal impedance of the cell will increase and, between fixed cell voltage limits, will result in progressive loss of capacity. Accordingly, it becomes difficult to attain the theoretical capacity of the carbonaceous material, which for example is thought to be 372 mAh/g for graphite. This progressive loss is commonly referred to by those skilled in the art as "capacity fade".

Accordingly, there is a requirement for an electrolyte which is capable of forming a stable passivation film using as little electrolyte as possible.

U.S. Pat. No. 5,028,500 (Fong, R. et al, Jul. 2, 1991) describes two solutions to prevent excessive electrolyte decomposition at highly graphitic carbonaceous intercalation hosts and the consequent loss of cell capacity and performance properties. The first is to form a dual phase carbonaceous intercalation host having a mean degree graphitization of at least 0.40, the first phase having a degree of graphitization greater than 0.40 and the second phase having a degree of graphitization less than 0.40. The other approach maintains the carbonaceous intercalation host at a temperature greater than about 50° C. during the intercalation of the host with lithium. Both approaches reduced electrolyte decomposition during the initial intercalation step, thereby improving the cell performance and capacity. However, a solution to electrolyte decomposition that does not require the replacement of single-phase highly graphitic intercalation hosts or heat treatment would be highly desirable.

Excessive electrolyte decomposition during the initial intercalation step of a highly graphitic carbonaceous intercalation host has also been suppressed by addition of sequestering agent, such as a crown ether, as disclosed in U.S. Pat. No. 5,130,211 (Wilkinson, D. P. et al, Jul. 1, 1992). The crown ether chelates with alkali metal and prevents both electrolyte solvent co-intercalation into the carbonaceous host and exfoliation of the carbonaceous host. Hence, the increase in surface area of carbonaceous materials is prevented and excessive electrolyte decomposition reduced.

The use of crown ether as a sequestering agent was further explored by Shu, Z. X. et al ("Effect of 12 Crown 4 on the Electrochemical Intercalation of Lithium into Graphite" J. Electrochem. Soc., 140: 6: L101–L103; 1993). The crown ether was found to suppress electrolyte solvent decomposition thus minimizing formation of gaseous products which, as discussed herein above, is believed to result in exposure of bare surfaces to the electrolyte, consumption of electrolyte and formation of a new passivation film on the bared or partially covered surfaces. However, crown ethers are expensive and generally highly toxic. Accordingly, there is a requirement for a viable alternative to the use of crown ethers.

In general, a lithium metal based rechargeable battery consists of a lithium metal anode and a transition metal oxide/sulfide cathode. During the battery operation, lithium ions are plated onto the lithium anode during charge and are dissolved in discharge. Propylene carbonate has been used as an electrolyte solvent for a lithium metal based rechargeable battery. Alkali metal-ion cells are a different type of cell altogether, and include a carbonaceous anode.

JPN. PAT. No. 86-133305 (Toyoguchi et al. 1986) teaches that the use of fluoro-ethylene carbonate to replace propylene carbonate electrolyte in such cells results in a longer lifetime than similar cells without fluoro-ethylene carbonate. This patent does not however, teach how to reduce the excessive amount of electrolyte decomposition in alkali metal-ion cells having a carbonaceous intercalation host by adding fluoro-ethylene carbonate to the propylene carbonate electrolyte.

A lithium metal based rechargeable battery has different physical and chemical properties and is considered to be a completely different battery system from a lithium ion battery according to this invention by those having ordinary skill in the art.

U.S. Pat. No. 5,529,859 (Shu et al., Jun. 25, 1996) and U.S. Pat. No. 5,571,635 (Shu et al., Nov. 6, 1996) describe a solution to prevent excessive electrolyte decomposition at highly graphitic carbonaceous intercalation hosts and the consequent loss of cell capacity and performance properties. The solution described involves the addition of a chlorinated organic solvent to either a propylene carbonate or a propylene/ethylene mixed carbonate electrolyte. The addition of at least two volume parts of chloroethylene carbonate to nine volume parts of a propylene carbonate electrolyte or at least one volume part to nine volume parts of an equal volume ratio propylene/ethylene carbonate mixed electrolyte or at least one volume part to nine volume parts of a 8:1 volume ratio propylene/ethylene carbonate mixed electrolyte was shown to effectively suppress electrolyte solvent decomposition. The chloroethylene carbonate forms a passivation film at a higher emf than propylene carbonate or propylene/ethylene carbonate electrolyte solvents. In the initial intercalation of the carbonaceous material of the anode, the chlorinated organic solvent undergoes electrochemical reduction at an emf substantially higher than that of conventional electrolyte solvents. Accordingly, a stable passivation film is formed on the surfaces of the carbonaceous material. The stable passivation film has limited solubility in the electrolyte solvent and is an electronic insulator and an ionic conductor for Li metal-ions.

Shu et al "Use of Chloroethylene Carbonate as an Electrolyte Solvent for a Graphite Anode in a Lithium-Ion Battery" J. Electrochem. Soc., 143: 7: July 1996 illustrates a problem associated with the use of chloroethylene carbonate in propylene carbonate or propylene/ethylene carbonate mixed solvent electrolyte employed in Lithium-Ion secondary cells. Particularly the cell efficiency is less than 92%. Cell efficiency is defined as the cell discharge capacity (graphite de-intercalation step) divided by the preceding charge capacity(graphite intercalation step) multiplied by 100%. A cell efficiency less than 100% is wasteful of charging electricity, results in a low cell capacity and is undesirable in a secondary cell. The low cell efficiency is believed to be due to a soluble chlorinated species formed by reduction of the chlorinated solvent containing electrolyte. This species is involved in a redox shuttle with the cell anode and cathode.

SUMMARY OF THE INVENTION

It is an object of the present invention to improve the cell efficiency as achieved by secondary cells containing a chlorinated electrolyte solvent while retaining their desirable properties of minimizing electrolyte decomposition and the reduction of capacity loss during the initial intercalation step.

According to one aspect of the present invention, there provided an electrolyte for a secondary alkali metal-ion cell including an anode of a carbonaceous material, said carbonaceous material being capable of having alkali metal-ions reversibly incorporated therein, the electrolyte comprising a solution of fluoro-ethylene carbonate capable of forming a stable passivation film on the carbonaceous anode and an alkali metal salt dissolved therein, and propylene carbonate. Optionally, ethylene carbonate is included.

Preferably, the anode comprises a carbonaceous material having a degree of graphitization (g), above about 0.40, preferably above about 0.80 and most preferably of about 1.0, as determined by the equation:

$$g=(3.45-d_{002})/0.085$$

wherein $d_{002}$ represents the spacing (Å) between the graphitic layers in the crystal structure of the carbonaceous material, said carbonaceous material being capable of having alkali metal-ions reversibly incorporated therein.

According to another aspect of the present invention there is provided a secondary alkali metal-ion cell, comprising a source of alkali metal-ions; an anode of a carbonaceous material, said carbonaceous material being capable of having alkali metal-ions reversibly incorporated therein, a cathode of an electrochemically active material capable of having the alkali metal-ions reversibly incorporated therein, and a substantially non-aqueous electrolyte comprising fluoro-ethylene carbonate, a salt of the alkali metal dissolved therein and propylene carbonate. Optionally, the electrolyte also includes ethylene carbonate.

Preferably, the anode comprises a carbonaceous material having a degree of graphitization (g), of above about 0.40, preferably of above about 0.80 and most preferably of about 1.0, as determined by the equation:

$$g=(3.45-d_{002})/0.085$$

wherein $d_{002}$ represents the spacing (Å) between the graphitic layers in the crystal structure of the carbonaceous material.

It will be understood that the term "incorporating" also encompasses intercalation.

BRIEF DESCRIPTION OF THE DRAWINGS

In drawings which illustrate embodiments of the present invention.

DETAILED DESCRIPTION OF THE PREFERRED EMBODIMENTS

Figure 1:
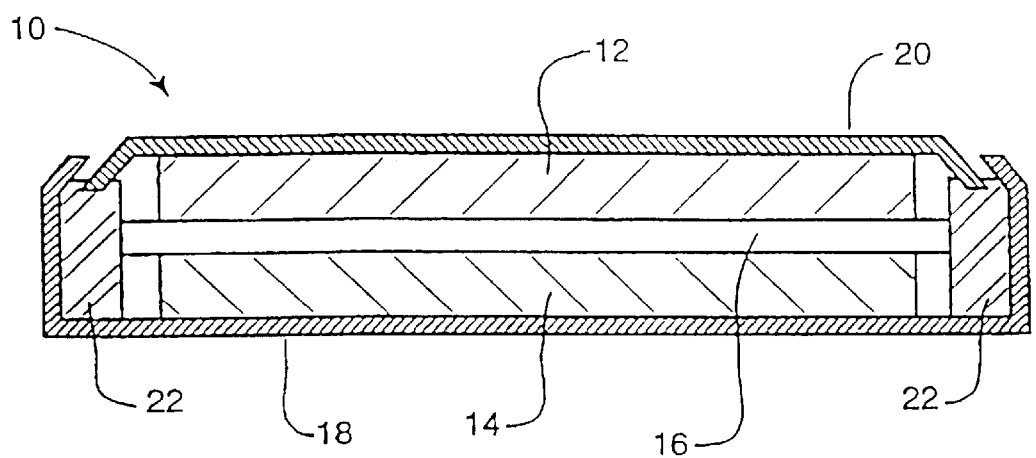
FIG. 1 is a cross-sectional view of a secondary coin cell according to one embodiment of the present invention.

The novel electrolyte composition of the present invention includes the use of fluoro-ethylene carbonate, propylene carbonate and, optionally ethylene carbonate in alkali metal-ion cells, having an anode of a carbonaceous material, having a high degree of graphitization. This system allows the use of propylene carbonate-based electrolytes in an alkali metal e.g. lithium ion cells containing a graphite anode without incurring a massive amount of electrolyte decomposition at the graphite anode. This finding is contrary to the common wisdom held by those having ordinary skill in the art that propylene carbonate decomposes substantially at the graphite anode and cannot be used with a graphite anode in such electrolytes.

The wide liquid range, and high dielectric constant of propylene carbonate make it an extremely attractive solvent to those having ordinary skill in the art and several unsuccessful attempts have previously been made to incorporate it in an electrolyte system for a lithium ion battery containing an anode with a high degree of graphitization, such as g=1.0.

As mentioned above, it is known to use chloro, and fluoro-ethylenecarbonate as an electrolyte solvent in cells having an alkali metal anode. Also, it is known to use chloro-ethylene carbonate as an electrolyte solvent in alkali metal-ion cells having a carbonaceous anode. However, it is not known that the use of fluoro-ethylene carbonate solvent with an alkali metal-ion cell having a carbonaceous anode material, would reduce excessive electrolyte decomposition by forming a stable passivation film on the surfaces of the carbonaceous anode material. It is also not known that the use of fluoro-ethylene carbonate solvent would substantially increase the cell efficiency by forming a stable passivation film on the surfaces of the carbonaceous anode material.

Without being bound by theory, it is believed that the fluorinated organic solvent results in a more effective electrolyte than chlorinated organic solvent electrolyte because it forms a stable passivation film without the formation of electrolyte soluble halogenated species. In the initial intercalation of the carbonaceous material of the anode, both the fluorinated and chlorinated organic solvents undergo electrochemical reduction at an emf substantially higher than that of conventional electrolyte solvents. Accordingly, a stable passivation film is formed on the surfaces of the carbonaceous material. The stable passivation film is insoluble in the electrolyte solvent and is an electronic insulator and an ionic conductor for alkali metal e.g. Li metal-ions. Chlorinated electrolyte solvents form a passivation film which is less stable and incorporates electrolyte soluble chlorinated species. These soluble species can migrate from anode to cathode in the cell participating in a redox shuttle which results in low cell efficiency for the secondary cell. The formation of a stable passivation film on the carbonaceous material of the anode significantly reduces electrolyte decomposition and concurrent consumption of alkali metal-ions. Accordingly, the use of a fluorinated organic solvent reduces the loss of cell capacity and improves the performance and life of the cell.

The substantially non-aqueous electrolyte of the present can be a liquid, paste-like or a solid. Preferably, the electrolyte is in liquid form.

The minimum volume ratio of fluoro-ethylene carbonate to propylene carbonate in a mixture thereof is dependent on the efficiency with which fluoroethylene carbonate forms a stable passivation film on the surfaces of the carbonaceous material of the anode. The efficiency of a fluorinated organic solvent to form a stable passivation film on a particular carbonaceous material with a known surface area can be readily determined by one of ordinary skill in the art without undue experimentation. This is best determined by preparing test cells, as will be discussed in Examples presented below, and determining the degree of cell capacity loss that occurs with each fluorinated organic solvent or at various concentrations in a mixed solvent.

The electrolyte salt is a salt of the alkali metal-ion used in the secondary cell and should be compatible with fluoro-ethylene carbonate, propylene carbonate, the carbonaceous material of the anode and the electrochemically active material of the cathode. When the alkali metal-ions of the secondary cell are, for example, lithium ions, suitable lithium electrolyte salts include $LiAsF_6$, $LiPF_6$, $LiClO_4$, $LiBF_4$, $LiCF_3SO_3$, $LiC(CF_3SO_2)_3$, $LiN(CF_3SO_2)_2$, $LiN(CF_3CF_2SO_2)_2$, LiI, LiBr, LiCl, $LiB(C_4H_4)_4$, $LiSO_3F$, $LiAlCl_4$ and mixtures thereof. The concentration of the alkali metal salt in the electrolyte solvent is preferably from about 0.5M to 1.5M.

The electrolyte may also contain an additive such as a crown ether, for example 12 crown 4, 15 crown 5 and 18 crown 6, an immobilizing agent, for example polyethylene oxide, or an inorganic gel-forming compound, for example $SiO_2$ and $Al_2O_3$.

Referring now to FIG. 1, a non-aqueous secondary cell according to one embodiment of the present invention has an anode 12 and a cathode 14 separated by a separator 16, such as a porous separator. The cell shown in FIG. 1 is a coin cell 10. However, it will be appreciated by those skilled in the art that the layered structure of the anode 12, the cathode 14 and the separator 16 can be adapted for a rectangular or cylindrical cell. The layered structure of the anode 12, the cathode 14 and the separator 16 is placed or assembled in a metallic container having a bottom 18, which acts as a current collector and terminal for the cathode 14, and a top 20, which serves as a current collector and terminal for the anode 12. An electronic insulating ring 22, such as a polypropylene ring, is placed between the bottom 18 and the top 20 of the container. Electrolyte is then injected into the cell 10 and the components of the coin cell 10 are crimped together by bending the top edge of the bottom 18 inwards against the electronic insulating ring 22 to form a gas-tight seal. In accordance with the present invention, the anode 12 is formed of a carbonaceous material capable of reversibly intercalating alkali metal-ions. Suitably, the carbonaceous material of the anode 12 has a degree of graphitization g above about 0.40, preferably above about 0.80 and most preferably about 1.0.

Preferably, the anode 12 is a powdered form of carbonaceous material, for example, synthetic graphite, such as KS15 graphite powder (Lonza), natural graphite, isotropic graphite, coke, carbon fibre, pyrolytic carbon, non-graphitizable carbon, or chemically modified carbon. Isotropic graphite can be prepared, for example, from a mixture of graphite and carbonized pitch with a degree of graphitization of greater than or equal to about 0.4 or a mixture of heat-treated fluid coke and commercial graphite, wherein the initial intercalation of alkali metal-ions is performed at or above a temperature of about 50° C. (U.S. Pat. No. 5,028,500, Fong, R. et al, Jul. 2, 1991). The chemically modified carbon includes carbon which incorporates other elements such as Al, Si, B, N, P or a mixture thereof. The carbonaceous material may be prepared by carbonization of furan resins (as described in U.S. Pat. No. 4,959,281, Azuma, H. et al, Sep. 25, 1990) with a layer spacing ($d_{002}$) less than or equal to about 3.70 Å and a density greater than or equal to about 1.70 g/cm$^3$. The carbonized furan resins may be doped with from about 2 to 5% phosphorus. The carbonaceous material may also be prepared by doping oxygenated petroleum or coal pitch with from about 2 to 5% phosphorous (European Patent Application Number 0 418 514 A1, Azuma, H. et al, Mar. 27, 1991). A suitable carbonaceous material may also be prepared by thermal decomposition of gas phase hydrocarbons or hydrocarbon compounds with a $d_{002}$ of from about 3.37 to 3.55 Å (U.S. Pat. No. 4,863,814, Mohri, M. et al, Sep. 5, 1989). Another suitable carbonaceous material is prepared from mesophase microspheres with a $d_{002}$ layer spacing of about 3.45 Å (U.S. Pat. No. 5,153,08, Ogimo, T. et al, Oct. 6, 1992). The carbonaceous material of the anode 12 may be incorporated with alkali metal-ions prior to assembly of the cell 10. Suitable alkali metal-ions include sodium, potassium and lithium ions. The preferred alkali metal-ions are lithium ions. However, as discussed earlier, compounds of the formula $M_xC$ are reactive materials that are difficult to handle in air. Accordingly, it is preferable that the carbonaceous material is intercalated in situ in the cell 10 by supplying a source of alkali metal-ions for the initial intercalation. This can be accomplished in a number of ways including using a cathode material having alkali metal-ions incorporated therein, providing a so-called "sacrificial" sheet of alkali metal or by using a higher concentration of alkali metal-ions in the electrolyte. Preferably, the alkali metal-ions are introduced to the carbonaceous material of the anode 12 via the cathode 14.

When the cell is assembled with a cathode material having alkali metal-ions incorporated therein, the cell 10 is in the discharged state. The alkali metal-ions are induced to intercalate with the carbonaceous material of the anode 12 by applying an externally generated electrical potential to charge the cell 10 and to draw alkali metal-ions from the cathode 14 through the electrolyte and into the carbonaceous material of the anode 12.

The cathode 14 comprises an electrochemically active material, such as, a chalcogenide of a transition metal. Chalcogens include oxygen, sulphur, selenium, tellurium and polonium. Preferred transition metals include manganese, nickel, iron, chromium, titanium, vanadium, molybdenum and cobalt.

Preferably, the electrochemically active material of the cathode 14 having alkali metal-ions incorporated therein is stable in air. Examples of suitable electrochemically active materials include alkali metal oxides and alkali metal sulphates of nickel, cobalt, tin, manganese, iron, chromium, titanium, vanadium, molybdenum and mixtures thereof, such as, alkali metal nickel oxides, alkali metal cobalt oxides and alkali metal mixed oxides of cobalt with nickel or tin. For example, when the alkali metal-ions are lithium ions, suitable lithiated electrochemically active materials are lithiated oxides of the formula $Li_xRO_2$, wherein R represents Co, Ni, Mn, Fe, Sn and Cr or a mixture thereof, for example $Li_xNiO_2$, $Li_xCoO_2$, $Li_xMnO_2$, $Li_xCo_{0.92}Sn_{0.06}O_2$ and $Li_xCo_{1-x}Ni_xO_2$, and other lithiated transition metal chalcogenides such as $LiTiS_2$, $LiVS_2$ and $LiVSe_2$. Another class of lithiated compounds suitable for use as an electrochemically active material is $Li_xCr_{1-x}Mn_xO_2$, as disclosed in U.S. Pat. No. 5,370,949 (Dec 6, 1994 by Davidson, I. J. et al), U.S. Pat. Nos. 5,506,078 and 5,629,112 (May 13, 1997 by Davidson, I. J. et al), incorporated by reference herein, discloses the use of orthorhombic $LiMnO_2$ also suitable for use as an electrochemically active material. Other suitable lithiated materials include $Li_xMn_2O_4$ and lithiated chevrel-phase materials.

In the case wherein the electrochemically active material does not act as the source of alkali metal-ions, preferred chalcogenides of transition metals are molybdenum sulphates, vanadium oxides and manganese oxides, for example $MoS_2$, $V_6O_3$, $Mo_6S_8$ or $MnO_2$.

The carbonaceous material of the anode 12 and the electrochemically active material of the cathode 14 are typically held together with a binder in an amount sufficient to bind the components. Suitable binders for both the carbonaceous material of the anode 12 and the electrochemically active material of the cathode 14 include a polymer of ethylene propylene diene monomer, polyethylene oxide, a polyfluorinated hydrocarbon, such as polytetra-fluoroethylene, polyhexafluoropropylene, polyvinyldiene fluoride, polyvinylidene difluoride and mixtures thereof. The binder is dissolved or dispersed in a liquid carrier which is typically evaporated after the anode 12 or cathode 14 is formed. It is desirable that the cathode 14 maintain its electrical conductivity at all states of charge. Furthermore, expansion and contraction of the anode during a discharge/charge cycle can cause carbonaceous particles to lose electrical contact with one another with a concomitant decrease in electrical conductivity. Conductivity may be enhanced by adding an electrically-conductive material, such as graphite or carbon black, to the cathode 14 or the anode 12.

The coin cell 10 may be prepared in a manner known to those skilled in the art, for example, by preparing pellets and/or by coating temporary or permanent supports, such as a carrier web, for the anode 12 and/or the cathode 14. Pellets of carbonaceous material or electrochemically active material for the production of the anode 12 or cathode 14, respectively, can be prepared in a manner known to those skilled in the art. The particulate carbonaceous material or electrochemically active material is mixed with a conductivity enhancer, if used, and a binder dissolved or dispersed in a carrier liquid. The carrier liquid is evaporated and the resultant mixture is pressed into pellet-form. The formation of the pellet may involve a sintering process.

In a coating process, a slurry of the carbonaceous material of the anode 12 or he electrochemically active material of the cathode 14, in particulate form, the conductivity enhancer, if used, and the binder dissolved or dispersed in carrier liquid is deposited on a temporary or permanent support (not shown). The carrier liquid is then evaporated. An example of a temporary support is Teflon™. Once the carrier liquid is evaporated, the anode 12 or cathode 14 respectively, is punched or otherwise removed from the, temporary support for subsequent assembly in the metallic container of the coin cell 10. A permanent support is conductive support, for example, a metallic support. The use of a conductive support or carrier web is preferable in the production of, for example, a cylindrical cell. A layered structure is then formed with the anode 12, the separator 16 and the cathode 14. In the case where the source of alkali metal-ions is a sacrificial sheet of alkali metal, the sheet of alkali metal is placed between the anode 12 and the separator 16 so that the sheet lies adjacent to and in contact with the anode 12. The layered structure is placed or assembled in the metallic container of the coin cell 10 with an electronic insulating ring 22 and electrolyte. The top 20 of the coin cell 10 is placed on the layered structure and the coin cell 10 is crimped together by bending the top edge of the bottom 12 inwards against the electronically insulating ring 22 to form a gas-tight seal. Alternatively, the cathode 14 may be deposited directly into the container of the cell 10, followed by injection of electrolyte, placement of the separator 16 and the anode 12. Additional electrolyte is injected into the cell 10 and the components of the coin cell 10 are crimped together by bending the top edge of the bottom 18 inwards against the electronic insulating ring 2 to form a gas-tight seal. The coin cell 10, when assembled, is generally in the discharged state. In the embodiment wherein the electrochemically active material of the cathode 14 has alkali metal-ions incorporated therein and in the embodiment wherein the electrolyte is provided with a higher concentration of alkali metal-ions, the alkali metal-ions are induced to intercalate with the carbonaceous material of the anode 12 by applying an externally generated electrical potential in order to charge the cell 10.

In the embodiment wherein the source of alkali metal-ions is a sacrificial sheet of alkali metal, the addition of electrolyte to the cell 10 causes the alkali metal in the sheet to intercalate into the carbonaceous anode material, because the alkali metal has a higher electrochemical potential than the anode 12.

It will be appreciated by those skilled in the art that, if the source of alkali metal-ions is provided by an already intercalated carbonaceous anode, the coin cell 10 is in a charged state.

Preparation of fluoro-ethylene carbonate is achieved by the substitution of the chlorine constituent of chloroethylene carbonate by a fluorine substituent. The source of fluorine is the fluoride anion of potassium fluoride. The substitution is effected by adding the stoichiometric amount of KF to chloroethylene carbonate under dry conditions and stirring the mixture for greater than 24 hours. The resultant product is purified by distillation to an overall yield of fluoroethylene carbonate of greater than 70%.

The following examples illustrate the invention. The procedures used in the examples are recognized by those skilled in the art to be indicative of the properties of an actual secondary cell.

EXAMPLE 1

Figure 2:
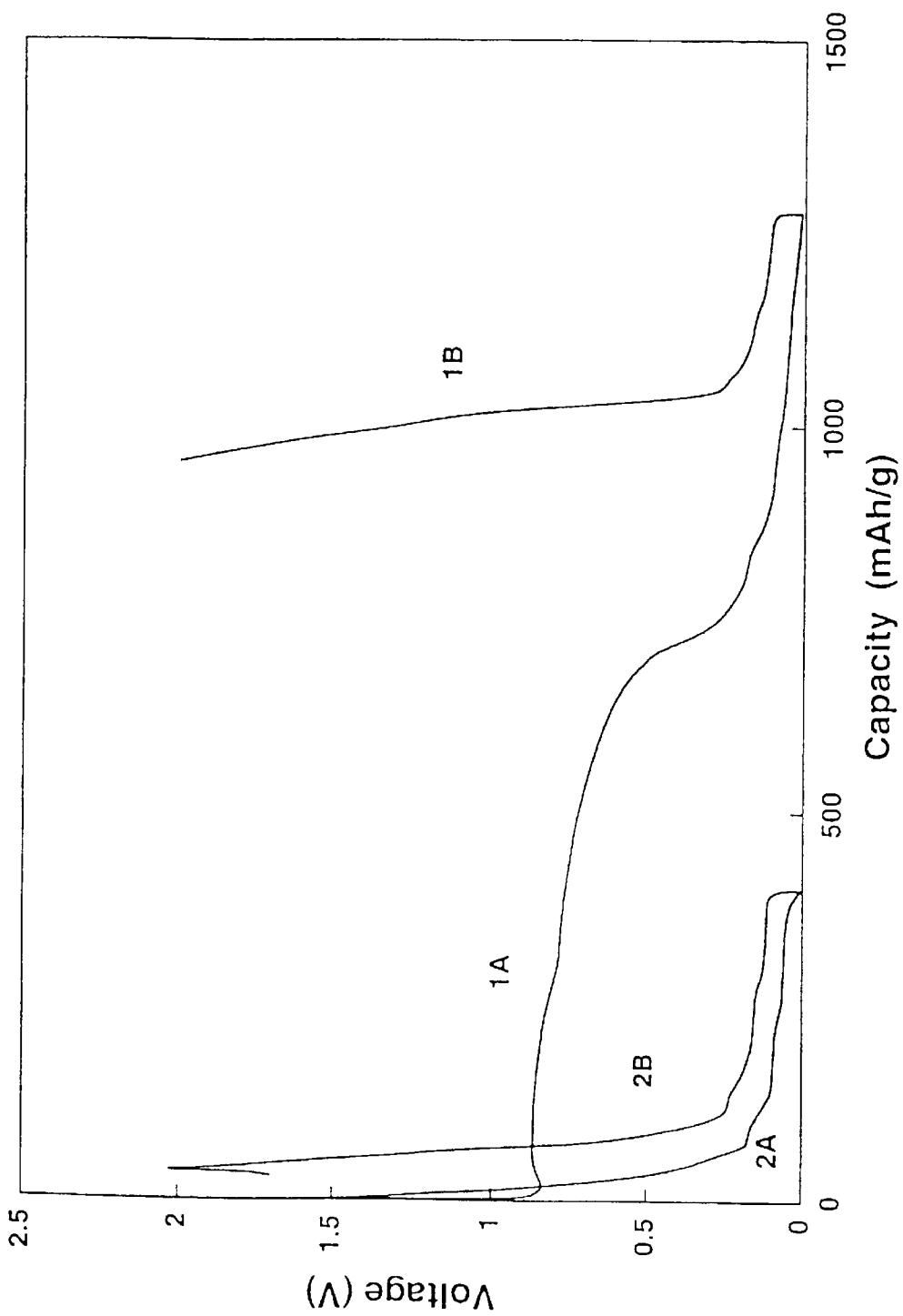
FIG. 2 is a graphical comparison of cell voltage versus specific capacity between a lithium/graphite cell prepared with a conventional electrolyte and a lithium/graphite cell prepared in accordance with an embodiment of the present invention.

A substantially non-aqueous electrolyte was prepared in a manner known to those skilled in the art with 1M $LiClO_4$ dissolved in an electrolyte solvent comprised of a 1:1 (by volume) mixture of propylene carbonate, and ethylene carbonate, as organic solvent. A carbonaceous electrode was made of graphite and formed into an electrode in a manner known to those skilled in the art and a Li/graphite test cell was prepared with the electrolyte. The carbonaceous electrode was lithiated by introducing the intercalation of lithium ions from a sheet of lithium metal with a current corresponding to a change of x=1 in $Li_xC_6$ (372 mah/g) over 20 hours. Curve 1A in FIG. 2 represents the voltage/capacity of the initial intercalation step. The subsequent de-intercalation is represented by curve 1B in FIG. 2. The cell of Example 1 without halogenated organic solvent showed substantial irreversible capacity loss.

EXAMPLE 2

A substantially non-aqueous electrolyte was prepared in a manner known to those skilled in the art with 1M $LiClO_4$ dissolved in an electrolyte solvent comprised of a 1:1 (by volume) mixture of chloroethylene carbonate(Aldrich) and propylene carbonate. A carbonaceous electrode was made of graphite and formed into an electrode in a manner known to those skilled in the art and a Li/graphite test cell was prepared with the electrolyte. The carbonaceous electrode was lithiated by introducing the intercalation of lithium ions from a sheet of lithium metal with a current corresponding to a change of x=1 in $Li_xC_6$ (372 mah/g) over 20 hours. The voltage/capacity data was plotted as per FIG. 2(not shown) for the initial intercalation and de-intercalation steps. The cell of Example 1 with chlorinated organic solvent demonstrated minimal irreversible capacity loss during the initial intercalation step.

EXAMPLE 3

A substantially non-aqueous electrolyte was prepared in a manner known to those skilled in the art with 1M $LiPF_6$ dissolved in an electrolyte solvent according to the present invention comprised of a 1:1 (by volume) mixture of fluoroethylene carbonate and propylene carbonate. A carbonaceous electrode was made of graphite and formed into an electrode in a manner known to those skilled in the art and a Li/graphite test cell was prepared with the electrolyte. The carbonaceous electrode was lithiated by introducing the intercalation of lithium ions from a sheet of lithium metal with a current corresponding to a change of x=1 in $Li_xC_6$ (372 mah/g) over 20 hours. Curve 2A in FIG. 2 represents the voltage/capacity of the initial intercalation step. The subsequent de-intercalation is represented by curve 2B in FIG. 2. The cell of Example 1 with fluorinated organic solvent demonstrated minimal irreversible capacity loss during the initial intercalation step. Table 1 summarizes the effect of using an electrolyte prepared with a halogenated organic solvent in the Li/graphite test cells of Examples 1 through 3.

TABLE 1

| EXAMPLE | IRREVERSIBLE CAPACITY DURING INITIAL INTERCALATION STEP (mAh/g) | REVERSIBLE CAPACITY (mAh/g) |
|---|---|---|
| 1 | 1036 | 315 |
| 2 | 86 | 328 |
| 3 | 85 | 316 |

EXAMPLE 4

A substantially non-aqueous electrolyte was prepared in a manner known to those skilled in the art with 1M $LiClO_4$ dissolved in an electrolyte solvent comprised of a mixture of chloroethylene carbonate (Aldrich), as the halogenated organic solvent, and propylene carbonate as organic solvent. The volume fraction of chloroethylene carbonate was in the range 0.1 to 1.0. Carbonaceous electrodes were made of graphite and formed into an electrode in a manner known to those skilled in the art. Li/graphite test cells were prepared with the electrolytes by varying volume fractions of chloroethylene carbonate. The carbonaceous electrode of each test cell was lithiated by introducing the intercalation of lithium ions from a sheet of lithium metal with a current corresponding to a change of x=1 in $Li_xC_6$ (372 mah/g) over 20 hours.

EXAMPLE 5

Figure 3:
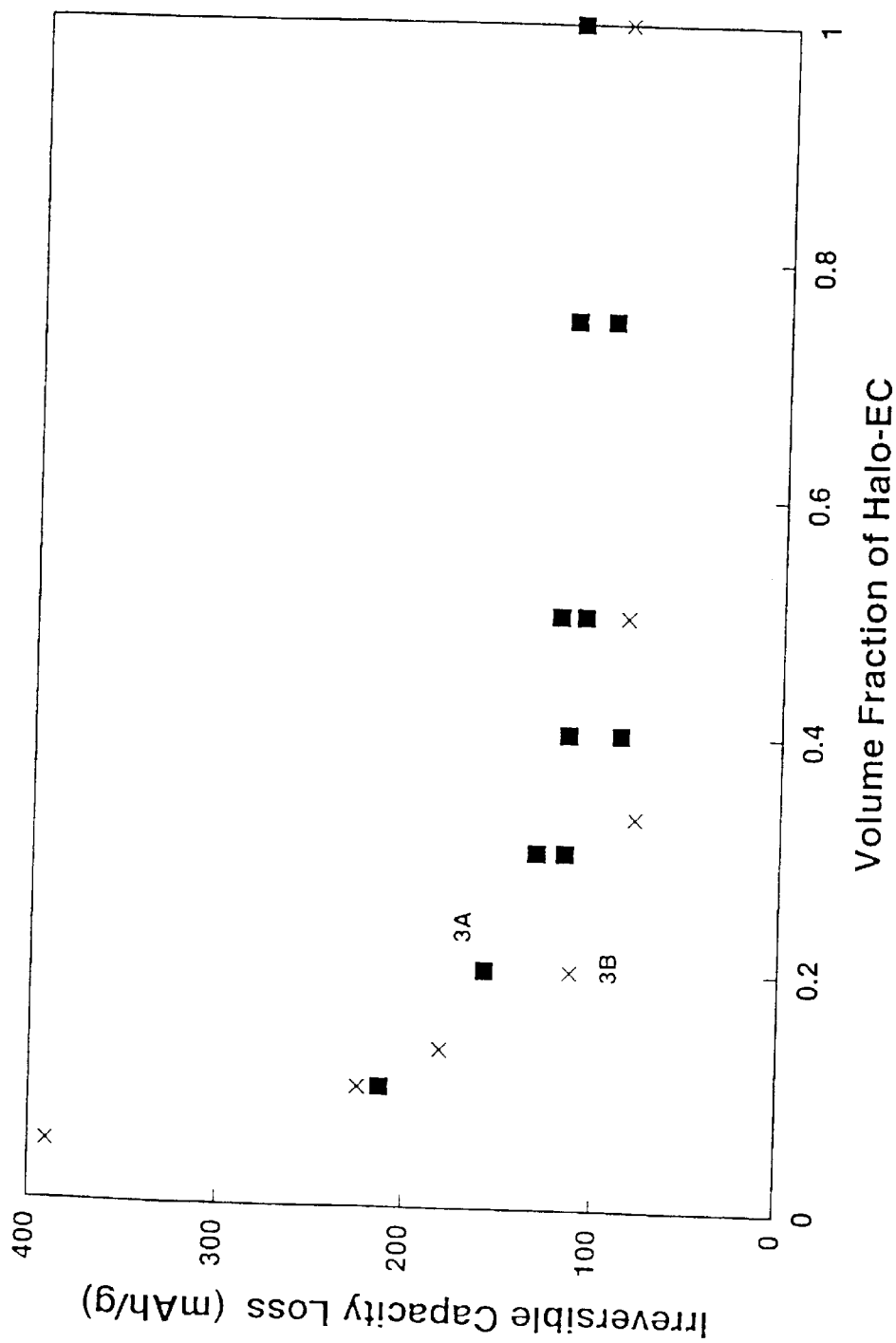
FIG. 3 is a graphical representation of the effect of the volume fraction of fluoro-ethylene carbonate and of chloroethylene carbonate in a bi-solvent electrolyte on the irreversible capacity loss of a secondary cell.

A substantially non-aqueous electrolyte was prepared in a manner known to those skilled in the art with 1M $LiPF_6$ dissolved in an electrolyte solvent according to the present invention comprised of a mixture of fluoro-ethylene carbonate as the halogenated organic solvent, and propylene carbonate as organic solvent. The volume fraction of chloroethylene carbonate was in the range 0.05 to 1.0. Carbonaceous electrodes were made of graphite and formed into an electrode in a manner known to those skilled in the art. Li/graphite test cells were prepared with the electrolytes by varying volume fractions of fluoro-ethylene carbonate. The carbonaceous electrode of each test cell was lithiated by introducing the intercalation of lithium ions from a sheet of lithium metal with a current corresponding to a change of x=1 in $Li_xC_6$ (372 mah/g) over 20 hours. The irreversible capacity loss in the first intercalation/deintercalation cycle is plotted in FIG. 3 against the volume fraction of halogenated ethylene carbonate(Halo-EC). Curve 3A is for chloroethylene carbonate(Example 4) and curve 3B is for fluoro-ethylene carbonate. It is clear from FIG. 3 that an increase in the volume fraction of either chloroethylene carbonate or fluoro-ethylene carbonate in the electrolyte reduces the extent of the irreversible capacity loss. It is also clear from curve 3A for chloroethylene carbonate and curve 3B for fluoro-ethylene carbonate that after the volume fraction of each reaches about 0.25 any greater volume fraction of halogenated ethylene carbonate results in no further irreversible capacity loss. It is also clear from the curves that for volume fractions of halogenated ethylene carbonate greater than about 0.2 the effect of similar volume fractions of fluoro-ethylene carbonate or chloroethylene carbonate on irreversible capacity loss is greater for fluoro-ethylene carbonate than chloroethylene carbonate. For Example 4 the optimum concentration of chloroethylene carbonate would be a volume fraction greater than or equal to 0.3 while for Example 5 the optimum concentration of fluoro-ethylene carbonate would be a volume fraction greater than or equal to 0.2. FIG. 3 also illustrates that the use of a halogenated organic solvent to replace a conventional organic electrolyte solvent reduces the extent of the irreversible capacity loss found with conventional organic electrolyte solvents and that fluorinated organic solvent has a greater effect than does chlorinated organic solvent. The present inventors acknowledge the presence of some ethylene carbonate in the sample of chloroethylene carbonate obtained from Aldrich and some ethylene carbonate and some chloroethylene carbonate in the prepared sample of fluoro-ethylene carbonate. However, it will be appreciated by those skilled in the art that it is reasonably inferred from the data of Example 4 and Example 5 that pure chloroethylene carbonate and pure fluoro-ethylene carbonate would yield substantially the same results as shown for the test cells prepared with a 1.0 volume fraction of chloroethylene or fluoro-ethylene carbonate respectively.

EXAMPLE 6

Figure 4:
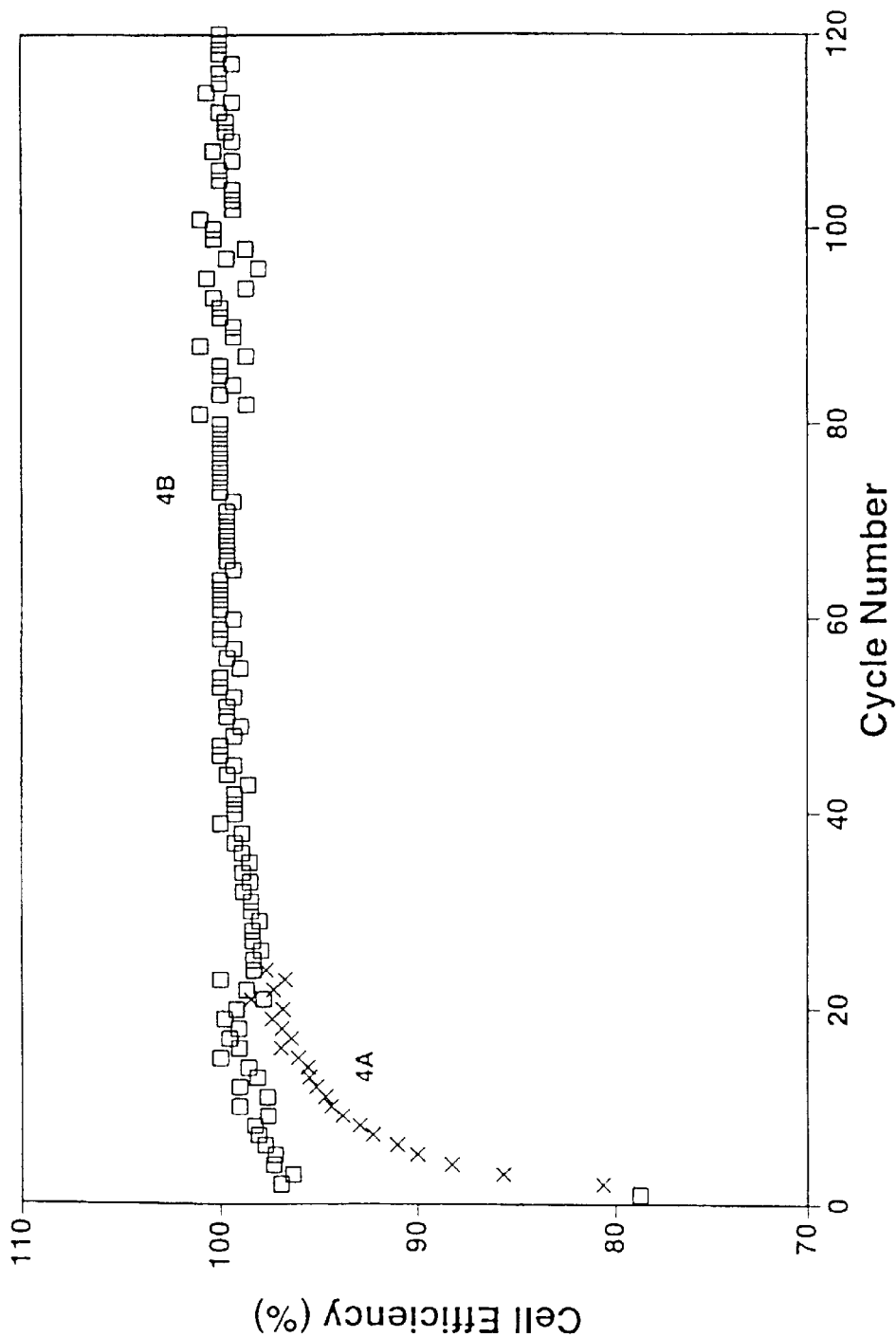
FIG. 4 is a graphical representation of the effect of repeated discharge/charge cycles on the cell efficiency of a lithium/graphite cell prepared with a conventional electrolyte and a lithium/graphite cell prepared in accordance with an embodiment of the present invention.

A substantially non-aqueous electrolyte was prepared in a manner known to those skilled in the art with 1 M $LiClO_4$ dissolved in an electrolyte solvent comprised of a 1:1 (by volume) mixture of propylene carbonate, and ethylene carbonate. as organic solvent. The electrolyte did not contain any halogenated organic solvent. A carbonaceous electrode was made of graphite and formed into an electrode in a manner known to those skilled in the art and a Li/graphite test cell was prepared with the electrolyte. The carbonaceous electrode was lithiated by introducing the intercalation of lithium ions from a sheet of lithium metal with a current corresponding to a change of x=1 in $Li_xC_6$ (372 mah/g) over 20 hours. The carbonaceous electrode was subjected to repeated intercalation/de-intercalation cycles. Curve 4A in FIG. 4 represents the cell efficiency for the intercalation de-intercalation step. The cell efficiency is defined as the capacity for the de-intercalation step divided by the capacity of the preceding intercalation step multiplied by 100%. To those skilled in the art the following is known; that a cell efficiency of 100% indicates that all the lithium intercalated in a step is removed in the subsequent de-intercalation step allowing the following intercalation step to be maximized in the amount of incorporated lithium, that a cell efficiency of significantly less than 100% results in capacity fade in the cell, that during the first few intercalation/de-intercalation steps the cell efficiency is less than 100% as a passivation film is formed on the graphite surface but rapidly nears 100% as the film completes formation and that any delay in the cell efficiency nearing 100% indicates a large amount of irreversible capacity which is not desired for proper cell operation. The cell of Example 6 showed a cell efficiency substantially less than 100% over the first 24 cycles with a maximum cell efficiency of 97%. There is a large irreversible capacity from passivation film formation and poor cell efficiency.

EXAMPLE 7

A substantially non-aqueous electrolyte was prepared in a manner known to those skilled in the art with 1M $LiPF_6$ dissolved in an electrolyte solvent according to the present invention comprised of a 1:4 (by volume) mixture of fluoro-ethylene carbonate and propylene carbonate. A carbonaceous electrode was made of graphite and formed into an electrode in a manner known to those skilled in the art and a Li/graphite test cell was prepared with the electrolyte. The carbonaceous electrode was lithiated by introducing the intercalation of lithium ions from a sheet of lithium metal with a current corresponding to a change of x=1 in $Li_xC6$ (372 mah/g) over 20 hours for the first 3 intercalation/de-intercalation cycles. Subsequent intercalation steps corresponded to a change of x=1 in $Li_xC6$ (372 mah/g) over 3 hours and subsequent de-intercalation steps to a change of x=1 in $Li_xC_6$ (372 mah/g) over 10 hours. The carbonaceous electrode was subjected to repeated intercalation/de-intercalation cycles. Curve 4B in FIG. 4 represents the cell efficiency for the intercalation/de-intercalation step. The cell of Example 7 showed a high cell efficiency of over 99.6% over the last 100 intercalation/de-intercalation cycles and a low amount of irreversible capacity from passivation film formation.

EXAMPLE 8

A substantially non-aqueous electrolyte was prepared in a manner known to those skilled in the art with 1M $LiClO_4$ dissolved in an electrolyte solvent comprised of a 1:1 (by volume) mixture of chloroethylene carbonate(Aldrich) and propylene carbonate. A carbonaceous electrode was made of graphite and formed into an electrode in a manner known to those skilled in the art and a Li/graphite test cell was prepared with the electrolyte. The carbonaceous electrode was lithiated by introducing the intercalation of lithium ions from a sheet of lithium metal with a current corresponding to a change of x=1 in $Li_xC_6$ (372 mah/g) over 20 hours. The carbonaceous electrode was subjected to repeated intercalation/de-intercalation cycles. The cell efficiency for the intercalation/de-intercalation steps was plotted as per FIG. 4 but is not shown. The cell of Example 8 showed similar results as Example 7 with a low amount of irreversible capacity from passivation film formation and a high cell efficiency over 98% over the last 60 intercalation/de-intercalation cycles.

EXAMPLE 9

A substantially non-aqueous electrolyte was prepared with 1M $LiClO_4$ dissolved in a electrolyte tri-solvent system comprising chloroethylene carbonate/propylene carbonate/ethylene carbonate in proportions by volume of 0.05/0.475/

0.475. A Li/graphite test cell was prepared in a manner similar to that described in Example 2. The capacity of the first intercalation/de-intercalation step was plotted in a similar manner to that depicted in FIG. 2 and the cell exhibited similar results to that of Example 2 with minimal irreversible capacity loss during the initial intercalation step. Results are shown in Table 2.

EXAMPLE 10

The procedure of Example 9 was repeated in a similar Li/graphite test cell using an electrolyte containing a tri-solvent system comprising fluoro-ethylene carbonate/propylene carbonate/ethylene carbonate in volume proportions of 0.05/0.475/0.475. Similar results were obtained to those of Example 9 with minimal, but significantly smaller irreversible capacity loss. Results of the tests of Examples 9 and 10 as well as the control test for halogen-free electrolyte of Example 1 are given in the following table:

TABLE 2

| EXAMPLE | IRREVERSIBLE CAPACITY DURING INITIAL INTERCALATION STEP (mAh/g) | REVERSIBLE CAPACITY (mAh/g) |
|---|---|---|
| 1 | 955 | 321 |
| 9 | 99 | 363 |
| 10 | 59 | 356 |

EXAMPLE 11

Figure 5:
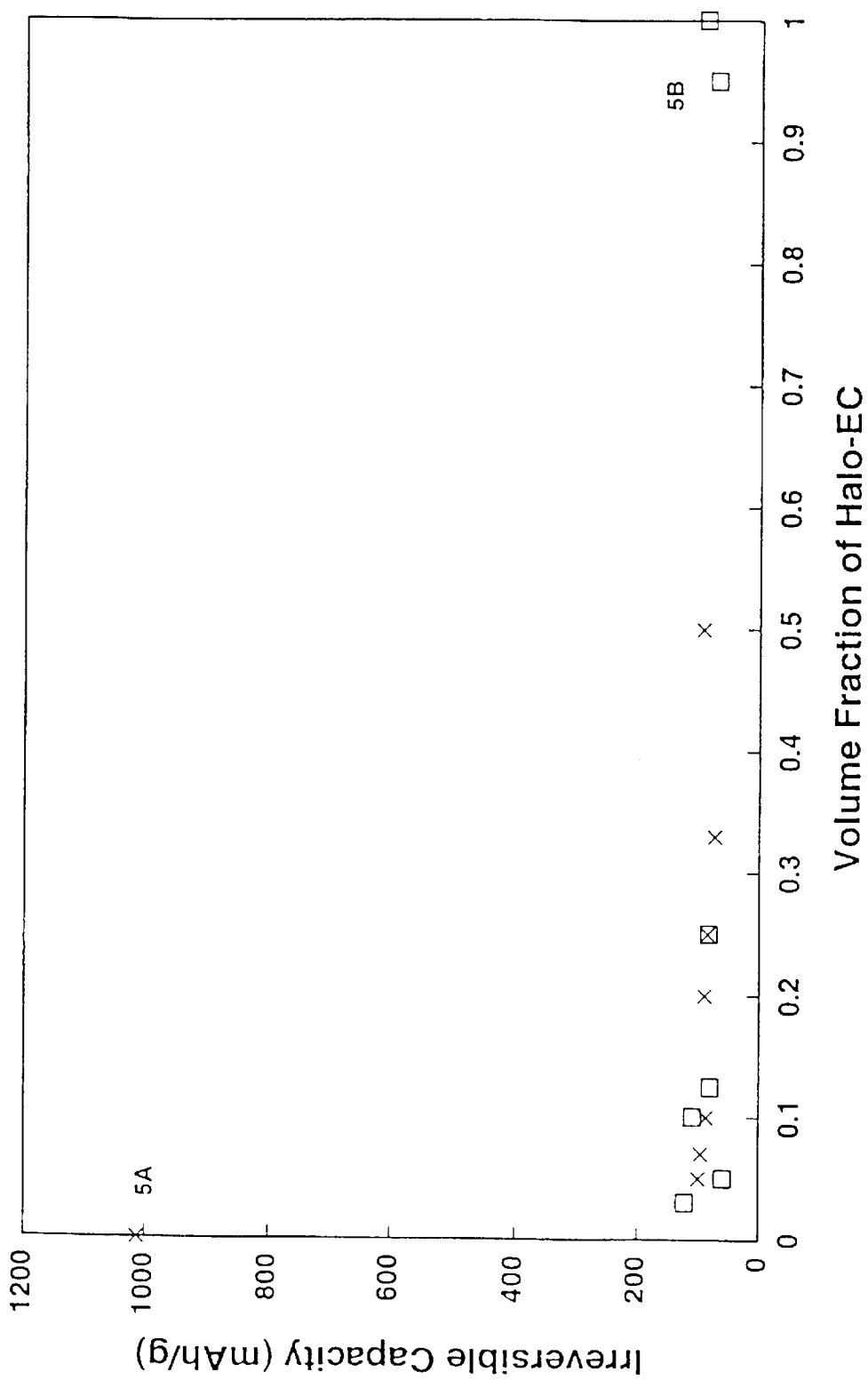
FIG. 5 is a graphical representation of the effect of the volume fraction of fluoro-ethylene carbonate and of chloroethylene carbonate in a tri-solvent electrolyte on the irreversible capacity loss of a secondary cell.

Experiments were carried out in which the volume fraction of propylene (PC) and ethylene carbonate (EC) were kept equal (i.e. PC/EC volume ratio was fixed at 1:1) and the amount of chloroethylene carbonate was varied in operating a Li/graphite cell. The voltage profile (not shown) of the first cycle for the Li/graphite cell using such a tri-solvent system resembled those described in Examples 2 and 3 with a bi-solvent. However the amount of chloroethylene carbonate required in a tri-solvent system in order to achieve the same level of reduction in electrolyte decomposition was substantially reduced. Curve 5A in FIG. 5 indicates the irreversible capacity as a function of the volume fraction of halogenated carbonate, in this Example chloroethylene carbonate (Chloro-EC) in Chloro-EC/EC/PC. The contrast is evident from a comparison of FIG. 3 (bi-solvent electrolyte) and FIG. 5 (tri-solvent electrolyte) and it is apparent that, in the presence of EC, the volume fraction of Chloro-EC can be reduced to as low as 0.05.

EXAMPLE 12

Experiments were carried out in which the volume fraction of propylene (PC) and ethylene carbonate (EC) were kept equal (i.e. PC/EC volume ratio was fixed at 1:1) and the amount of fluoro-ethylene carbonate was varied in operating a Li/graphite cell. The voltage profile (not shown) of the first cycle for the Li/graphite cell using such a tri-solvent system resembled those described in Examples 2 and 3 with a bi-solvent. However the amount of chloroethylene carbonate required in a tri-solvent system in order to achieve the same level of reduction in electrolyte decomposition was substantially reduced. Curve 5B in FIG. 5 indicates the irreversible capacity as a function of the volume fraction of halogenated carbonate, in this Example fluoro-ethylene carbonate (Fluoro-EC) in Fluoro-EC/EC/PC. The contrast is evident from a comparison of FIG. 3 (bi-solvent electrolyte) and FIG. 5 (tri-solvent electrolyte) and it is apparent that, in the presence of EC, the volume fraction of Fluoro-EC can be reduced to as low as 0.03. The contrast between Fluoro-EC and Chloro-EC as the halogenated carbonate of the tri-solvent electrolyte is evident from a comparison of curve 5A and 5B in FIG. 5 and it is apparent that Fluoro-EC is as effective as Chloro-EC.

EXAMPLE 13

Figure 6:
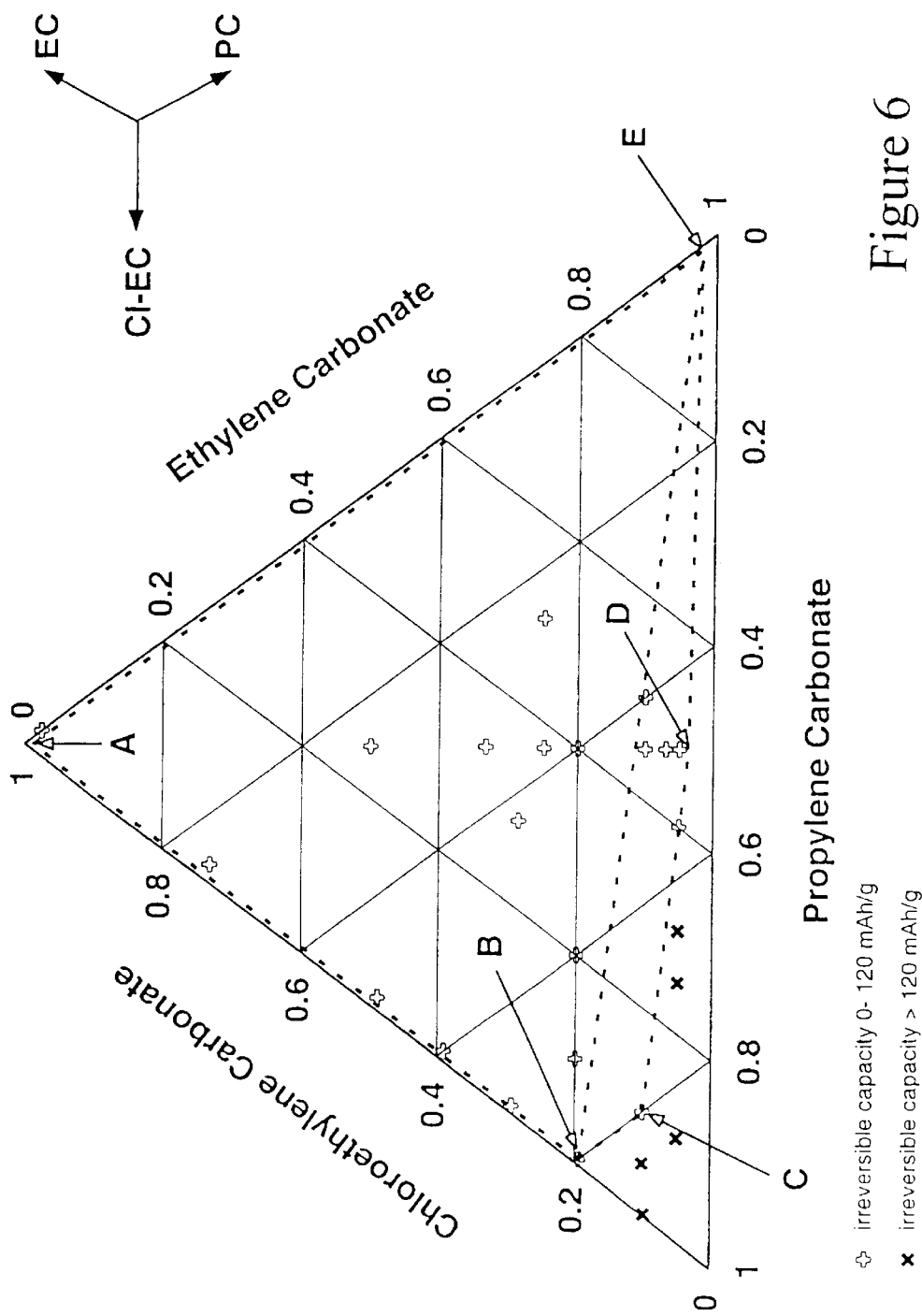
FIG. 6 is a three-component composition diagram illustrating the variation in irreversible capacity for tri-solvent electrolyte systems with differing proportions of chloroethylene carbonate, propylene carbonate and ethylene carbonate.

A substantial number of tri-solvent systems with varying proportions of PC,EC and Chloro-EC were tested in a Li/graphite cell for levels of irreversible capacity loss and the results were plotted as a three component composition diagram for chloroethylene carbonate, propylene carbonate and ethylene carbonate as shown in FIG. 6. The arrow illustration included with FIG. 6 is used to determine the solution compositions given in this figure. From the composition point of interest, one moves to the appropriate axis along the arrow direction to read the volume fraction of that component. As a final check, the three volume fractions must sum to one.

The co-ordinates for the points A,B,C,D and E are set out in the following Table 3;

TABLE 3

| Point in three-component composition diagram | Volume proportion in electrolyte | | |
|---|---|---|---|
| | Chloro-EC | PC | EC |
| A | 0.98 | 0.01 | 0.01 |
| B | 0.20 | 0.79 | 0.01 |
| C | 0.10 | 0.90 | 0.10 |
| D | 0.05 | 0.475 | 0.475 |
| E | 0.01 | 0.01 | 0.98 |

Tri-solvent compositions falling on and within the area bounded by points A,B,C,D and E give rise to acceptable levels of irreversible capacity of 120 mAh/g or less, whereas the area outside ABCDE recorded unacceptably high levels of more than 120 mAh/g, with some results even being above 150 mAh/g. Preferred compositions are those falling within the area bounded by and including points BCDE, which exhibited good results while utilizing only relatively small amounts of chloroethylene carbonate.

EXAMPLE 14

Figure 7:
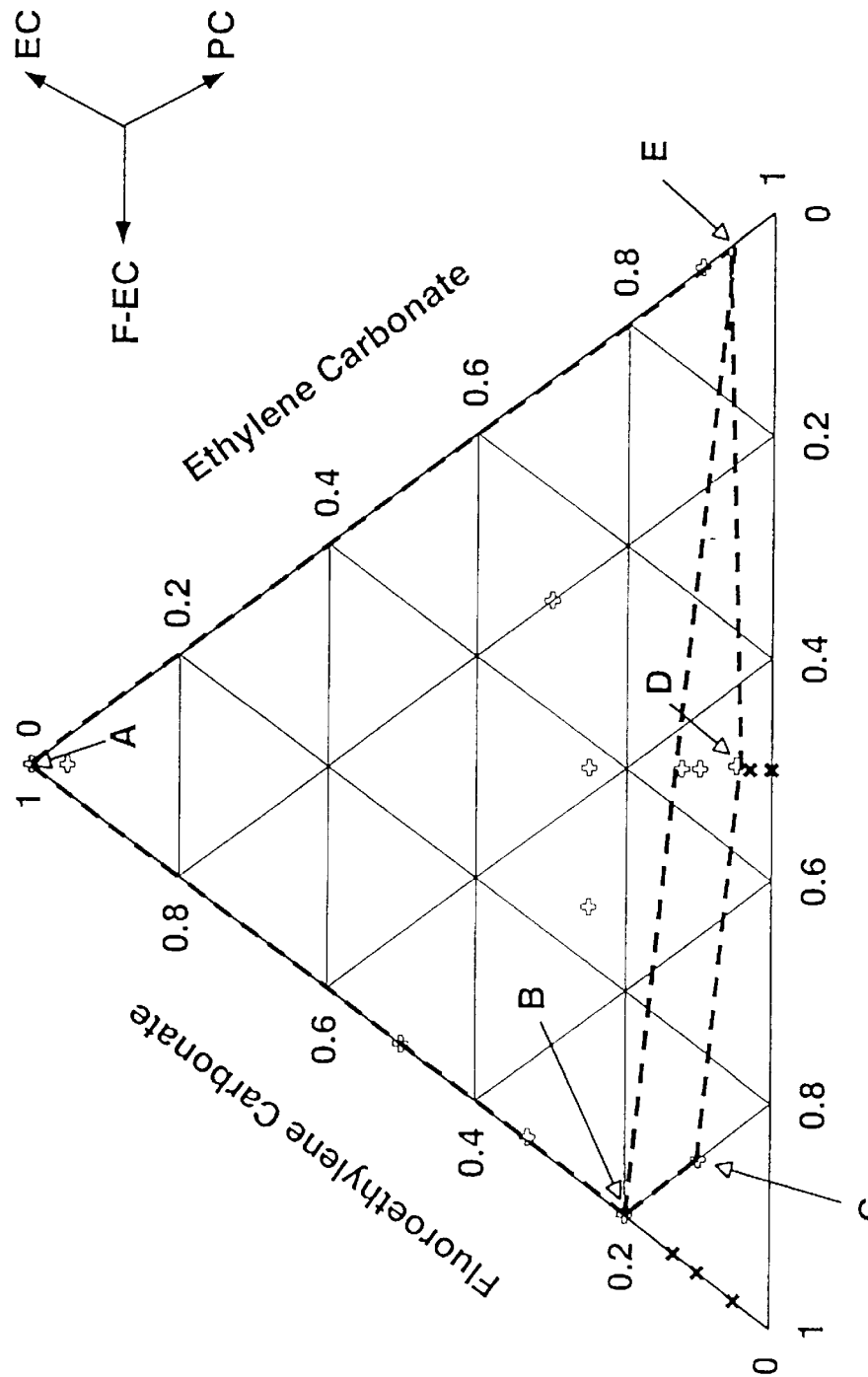
FIG. 7 is a three-component composition diagram illustrating the variation in irreversible capacity for tri-solvent electrolyte systems with differing proportions of fluoro-ethylene carbonate, propylene carbonate and ethylene carbonate.

A substantial number of tri-solvent systems with varying proportions of PC,EC and Fluoro-EC were tested in a Li/graphite cell for levels of irreversible capacity loss and the results were plotted as a three component composition diagram for fluoro-ethylene carbonate, propylene carbonate and ethylene carbonate as shown in FIG. 7. The arrow illustration included with FIG. 7 is used to determine the solution compositions given in this figure. From the composition point of interest, one moves to the appropriate axis along the arrow direction to read the volume fraction of that component. As a final check, the three volume fractions must sum to one.

The co-ordinates for the points A,B,C,D and E are set out in the following Table 4;

TABLE 4

| Point in three-component composition diagram | Volume proportion in electrolyte | | |
|---|---|---|---|
| | Fluoro-EC | PC | EC |
| A | 1.00 | 0.00 | 0.00 |
| B | 0.20 | 0.79 | 0.01 |
| C | 0.10 | 0.90 | 0.10 |
| D | 0.03 | 0.485 | 0.485 |
| E | 0.01 | 0.01 | 0.98 |

Tri-solvent compositions falling on and within the area bounded by points A,B,C,D and E give rise to acceptable levels of irreversible capacity of 120 mAh/g or less, whereas the area outside ABCDE recorded unacceptably high levels of more than 120 mAh/g, with some results even being above 200 mAh/g. Preferred compositions are those falling within the area bounded by and including points BCDE, which exhibited good results while utilizing only relatively small amounts of fluoro-ethylene carbonate. The contrast between Fluoro-EC and Chloro-EC as the halogenated carbonate of the tri-solvent electrolyte is evident from a comparison of FIG. 6 and FIG. 7 and it is apparent that Fluoro-EC is as effective as Chloro-EC.

EXAMPLE 15

Figure 8:
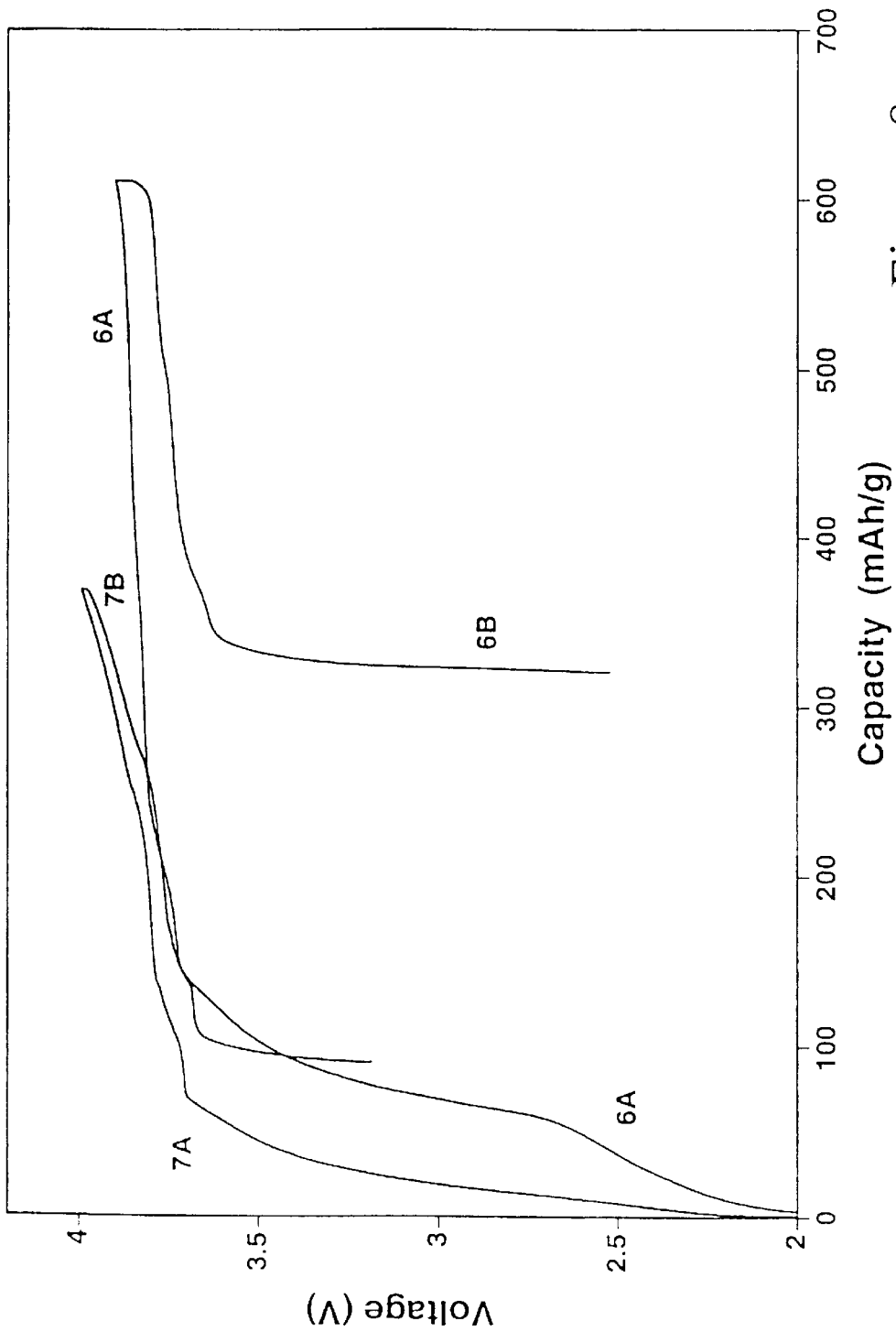
FIG. 8 is a graphical comparison of cell voltage versus specific capacity between a graphite/LiCoO$_2$ cell prepared with a chloroethylene carbonate containing electrolyte and a graphite/LiCoO$_2$ cell prepared in accordance with an embodiment of the present invention.

A substantially non-aqueous electrolyte was prepared in a manner known to those skilled in the art with 1M $LiClO_4$ dissolved in an electrolyte solvent comprised of a 1:1 (by volume) mixture of chloroethylene carbonate (Aldrich), as the halogenated organic solvent, and propylene carbonate as organic solvent. A carbonaceous electrode was made of graphite and formed into an electrode in a manner known to those skilled in the art and a graphite/$LiCoO_2$ lithium-ion test cell was prepared with the electrolyte. The carbonaceous electrode was lithiated by introducing the intercalation of lithium ions from the $LiCoO_2$ electrode with a current corresponding to a change of x=1 in $Li_xC_6$ (372 mah/g) over 20 hours. Curve 6A in FIG. 8 represents the voltage/capacity of the initial graphite intercalation step. The subsequent de-intercalation is represented by curve 6B in FIG. 8. The cell of Example 15 with chloroethylene carbonate as the halogenated organic solvent showed substantial irreversible capacity loss.

EXAMPLE 16

A substantially non-aqueous electrolyte was prepared in a manner known to those skilled in the art with 1 M $LiPF_6$ dissolved in an electrolyte solvent according to the present invention comprised of a 1:3.5:3.5 (by volume) mixture of fluoro-ethylene carbonate, as the halogenated organic solvent, propylene carbonate and ethylene carbonate as organic solvent. A carbonaceous electrode was made of graphite and formed into an electrode in a manner known to those skilled in the art and a graphite/$LiCoO_2$ lithium-ion test cell was prepared with the electrolyte. The carbonaceous electrode was lithiated by introducing the intercalation of lithium ions from the $LiCoO_2$ electrode with a current corresponding to a change of x=1 in $Li_xC_6$ (372 mah/g) over 20 hours. Curve 7A in FIG. 8 represents the voltage/capacity of the initial graphite intercalation step. The subsequent de-intercalation is represented by curve 7B in FIG. 8. The cell of Example 16 with fluoro-ethylene carbonate as the halogenated organic solvent showed minimal irreversible capacity loss.

EXAMPLE 17

A substantially non-aqueous electrolyte was prepared in a manner known to those skilled in the art with 1M $LiClO_4$ dissolved in an electrolyte solvent according to the present invention comprised of a 1:1.5:1.5 (by volume) mixture of fluoroethylene carbonate, as the halogenated organic solvent, propylene carbonate, and ethylene carbonate as organic solvent. A carbonaceous electrode was made of graphite and formed into an electrode in a manner known to those skilled in the art and a graphite/$LiCoO_2$ lithium-ion test cell was prepared with the electrolyte. The carbonaceous electrode was lithiated by introducing the intercalation of lithium ions from the $LiCoO_2$ electrode with a current corresponding to a change of x=1 in $Li_xC_6$ (372 mah/g) over 20 hours. The voltage/capacity curve of the initial graphite intercalation step and the subsequent de-intercalation step was plotted as per EXAMPLE 16 but is not shown and gave similar results. The cell of Example 17 with fluoro-ethylene carbonate as the halogenated organic solvent showed minimal irreversible capacity loss. Table 5 summarizes the effect of using an electrolyte prepared with a halogenated organic solvent in the graphite/$LiCoO_2$ lithium-ion test cells of Examples 15 through 17. It can be seen that when Chloro-EC is the halogenated solvent(Example 15) the irreversible capacity is large but when Fluoro-EC is the halogenated solvent(Example 16 and 17) the irreversible capacity is minimal. This is in contrast to the Examples for Li/graphite test cells when either Chloro- or Fluoro-EC is the halogenated solvent the irreversible capacity loss is minimal. It can be appreciated by those skilled in the art that the difference in irreversible capacity loss here is due to an electrochemical shuttle species formed when Chloro-EC is the halogenated solvent but not when Fluoro-EC is the halogenated solvent. The shuttle species is not generated when neither electrode rises above 3 volts such as in a Li/graphite test cell.

TABLE 5

| EXAMPLE | IRREVERSIBLE CAPACITY DURING INITIAL INTERCALATION STEP (mAh/g) | CAPACITY (mAh/g) |
|---|---|---|
| 15 | 321 | 290 |
| 16 | 90 | 279 |
| 17 | 118 | 273 |

EXAMPLE 18

Figure 9:
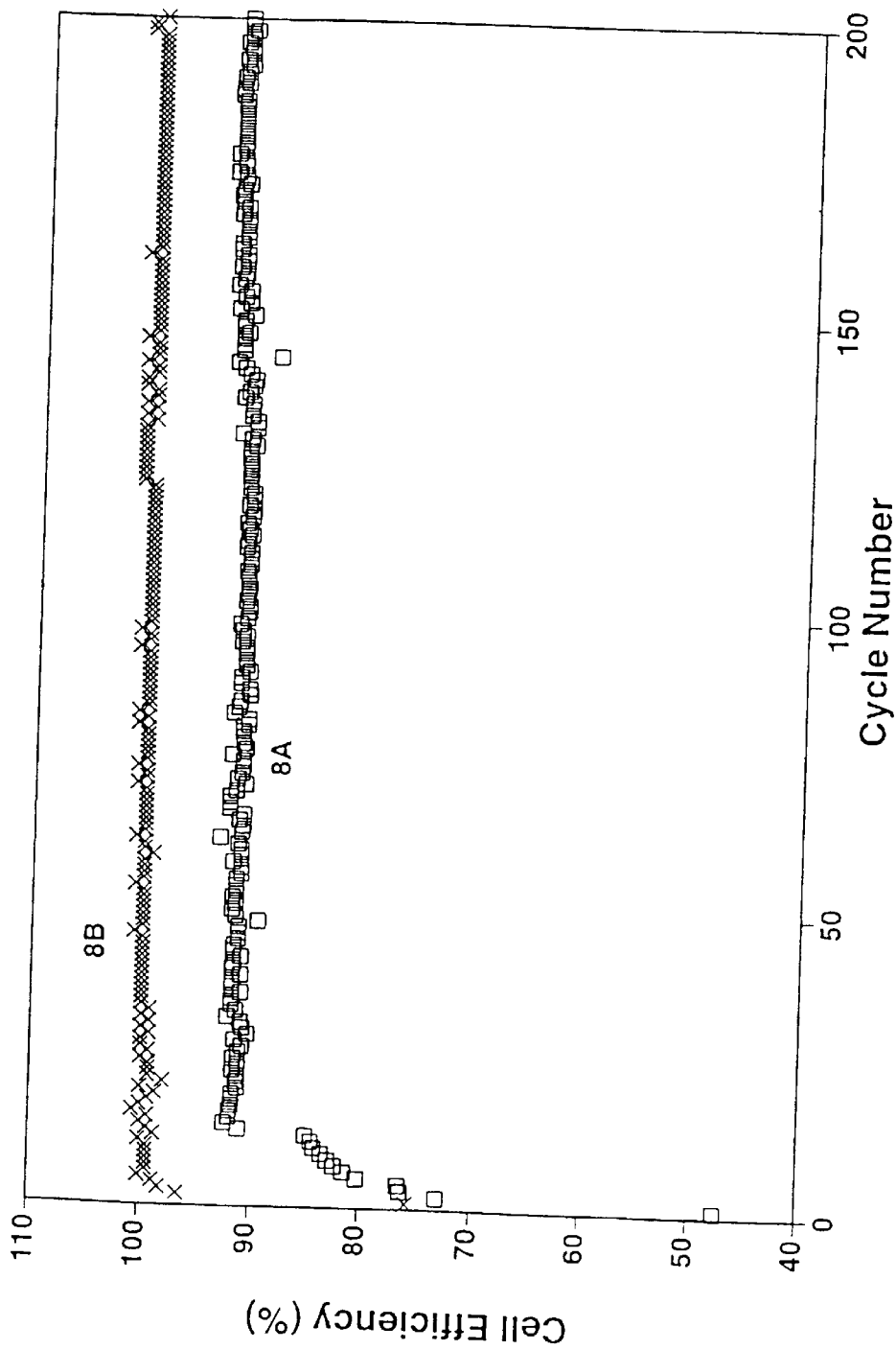
FIG. 9 is a graphical representation of the effect of repeated discharge/charge cycles on the cell efficiency of a graphite/LiCoO$_2$ cell prepared with a chloroethylene carbonate containing electrolyte and a graphite/LiCoO$_2$ cell prepared in accordance with an embodiment of the present invention.

A substantially non-aqueous electrolyte was prepared in a manner known to those skilled in the art with 1M $LiClO_4$ dissolved in an electrolyte solvent comprised of a 1:1.5:1.5 (by volume) mixture of chloroethylene carbonate (Aldrich), as the halogenated organic solvent, propylene carbonate, and ethylene carbonate as organic solvent. A carbonaceous electrode was made of graphite and formed into an electrode in a manner known to those skilled in the art and a graphite/$LiCoO_2$ lithium-ion test cell was prepared with the electrolyte. The carbonaceous electrode was lithiated by introducing the intercalation of lithium ions from the $LiCoO_2$ electrode with a current corresponding to a change of x=1 in $Li_xC_6$ (372 mah/g) over 3 to 10 hours. The carbonaceous electrode was subjected to repeated intercalation/de-intercalation cycles. Curve 8A in FIG. 9 represents the cell efficiency of the lithium-ion test cell after each de-intercalation step of the graphite electrode. The cell efficiency corresponds to the capacity of the lithium ion cell discharge step(graphite de-intercalation) divided by the capacity of the previous cell charge step(graphite intercalation) multiplied by 100%. The cell of Example 18 with chloroethylene carbonate solvent demonstrated extremely poor cell efficiency on the first cycle and for subsequent cycles poor cell efficiency.

EXAMPLE 19

A substantially non-aqueous electrolyte was prepared in a manner known to those skilled in the art with 1M $LiPF_6$ dissolved in an electrolyte solvent according to the present invention comprised of a 1:3.5:3.5 (by volume) mixture of fluoro-ethylene carbonate, as the halogenated organic solvent, propylene carbonate, and ethylene carbonate as organic solvent. A carbonaceous electrode was made of graphite and formed into an electrode in a manner known to those skilled in the art and a graphite/$LiCoO_2$ lithium-ion test cell was prepared with the electrolyte. The carbonaceous electrode was lithiated by introducing the intercalation of lithium ions from the $LiCoO_2$ electrode with a range of current corresponding to a change of x=1 in $Li_xC_6$ (372 mah/g) over 3 to 20 hours. The carbonaceous electrode was subjected to repeated intercalation/de-intercalation cycles. Curve 8B in FIG. 9 represents the cell efficiency of the lithium-ion test cell after each de-intercalation step of the graphite electrode. The cell of Example 19 with fluoro-ethylene carbonate solvent demonstrated excellent cell efficiency for all cycles with an efficiency of near 100% after the first 5 intercalation/de-intercalation steps.

EXAMPLE 20

A substantially non-aqueous electrolyte was prepared in a manner known to those skilled in the art with 1M $LiClO_4$ dissolved in an electrolyte solvent according to the present invention comprised of a 1:1.5:1.5 (by volume) mixture of fluoroethylene carbonate, as the halogenated organic solvent, propylene carbonate, and ethylene carbonate as organic solvent. A carbonaceous electrode was made of graphite and formed into an electrode in a manner known to those skilled in the art and a graphite/$LiCoO_2$ lithium-ion test cell was prepared with the electrolyte. The carbonaceous electrode was lithiated by introducing the intercalation of lithium ions from the $LiCoO_2$ electrode with a range of current corresponding to a change of x=1 in $Li_xC_6$ (372 mah/g) over 3 to 10 hours. The carbonaceous electrode was subjected to repeated intercalation/de-intercalation cycles. The cell efficiency of the lithium-ion test cell after each de-intercalation step of the graphite electrode was plotted as per FIG. 9 but is not shown and was similar to the curve of EXAMPLE 19. The cell of Example 20 with fluoro-ethylene carbonate solvent demonstrated excellent cell efficiency for all cycles with an efficiency of near 100% after the first 5 intercalation/de-intercalation steps. Example 18 illustrates that the passivation film formed with a chlorinated solvent electrolyte is not completely stable to repeated intercalation and de-intercalation of alkali metal-ions into the carbonaceous material during charge/discharge cycles. A soluble species is formed which acts as a redox shuttle so that cell efficiency is low. Examples 19 and 20 illustrate that the use of a fluorinated organic solvent in the electrolyte of the present invention results in the formation of a stable passivation film with no or extremely low amount of soluble species. The passivation film is stable to repeated intercalation and de-intercalation of alkali metal-ions into the carbonaceous material during charge/discharge cycles, thereby significantly increasing the cell efficiency. Examples 19 and 20 establish that the addition of a fluorinated organic solvent to the electrolyte solvent of a lithium-ion electrochemical cell having a carbonaceous anode material substantially reduces the irreversible capacity that occurs on the initial intercalation step and the low efficiency of the cells.

We claim:

1. An electrolyte for a secondary alkali metal-ion cell including an anode of a carbonaceous material said carbonaceous material being capable of having alkali metal-ions reversibly incorporated therein, the electrolyte comprising a solution of fluoro-ethylene carbonate, an alkali metal salt dissolved therein and propylene carbonate.

2. An electrolyte according to claim 1, additionally comprising ethylene carbonate.

3. An electrolyte according to claim 2, wherein the fluoro-ethylene carbonate, propylene carbonate and ethylene carbonate are present in the electrolyte in relative proportions by volume which fall on or within the area defined by the points ABCDE of the fluoro-ethylene carbonate/propylene carbonate/ethylene carbonate three-component composition diagram shown in FIG. 7 of the drawings, wherein the relative proportions of fluoro-ethylene carbonate, propylene carbonate and ethylene carbonate, respectively, are, 0.98, 0.01, 0.01 for point A, 0.20, 0.79, 0.01 for point B, 0.10, 0.80, 0.10 for point C, 0.05, 0.475, 0.475 for point D, and 0.01, 0.01, 0.98 for point E, and the sum of said relative proportions being equal to 1.00.

4. An electrolyte according to claim 3, wherein the fluoro-ethylene carbonate, propylene carbonate and ethylene carbonate are present in the electrolyte in relative proportions by volume which fall on or within the area defined by the points BCDE of the fluoro-ethylene carbonate/propylene carbonate/ethylene carbonate three-component composition diagram shown in FIG. 7 of the drawings, wherein the relative proportions of fluoro-ethylene carbonate, propylene carbonate and ethylene carbonate, respectively, are, 0.20, 0.79, 0.01 for point B, 0.10, 0.80, 0.10 for point C, 0.05, 0.475, 0.475 for point D, and 0.01, 0.01, 0.98 for point E, the sum of said relative proportions being equal to 1.00.

5. An electrolyte according to claim 1, wherein the concentration of the alkali metal salt is in the range of from about 0.5 M to 1.5 M.

6. An electrolyte according to claim 1, further comprising an additive selected from the group consisting of crown ethers, immobilizing agents and inorganic gel-forming compounds.

7. An electrolyte according to claim 1, wherein the alkali metal is lithium.

8. An electrolyte according to claim 1, wherein the carbonaceous material has a degree of graphitization (g) of 0.40 to 1.0, as determined by the equation:

$$g=(3.45-d_{002})/0.085$$

wherein $d_{002}$ represents the spacing (A) between the graphitic layers in the crystal structure of the carbonaceous material, said carbonaceous material being capable of having alkali metal-ions reversibly incorporated therein.

9. An electrolyte according to claim 8, wherein the carbonaceous material is selected from the group consisting of synthetic graphite, natural graphite, isotropic graphite, carbon fibre, pyrolytic carbon and chemically modified carbon.

10. A secondary alkali metal-ion cell, comprising a source of alkali metal-ions, an anode of a carbonaceous material said carbonaceous material being capable of having the alkali metal-ions reversibly incorporated therein, a cathode of an electrochemically active material capable of having the alkali metal-ions reversibly incorporated therein, and a substantially non-aqueous electrolyte comprising fluoroethylene carbonate, a salt of the alkali metal dissolved therein and propylene carbonate.

11. A cell according to claim 10, wherein the electrolyte additionally comprises ethylene carbonate.

12. A cell according to claim 11, wherein the fluoro-ethylene carbonate, propylene carbonate and ethylene carbonate are present in the electrolyte in relative proportions by volume which fall on or within the area defined by the points ABCDE of the fluoro-ethylene carbonate/propylene carbonate/ethylene carbonate three-component composition diagram shown in FIG. 7 of the drawings, wherein the relative proportions of fluoro-ethylene carbonate, propylene carbonate and ethylene carbonate, respectively, are, 0.98, 0.01, 0.01 for point A, 0.20, 0.79, 0.01 for point B, 0.10, 0.80, 0.10 for point C, 0.05, 0.475, 0.475 for point D, and 0.01, 0.01, 0.98 for point E, and the sum of said relative proportions being equal to 1.00.

13. A secondary alkali metal-ion cell according to claim 12, wherein the fluoro-ethylene carbonate, propylene carbonate and ethylene carbonate are present in the electrolyte in relative proportions by volume which fall on or within the area defined by the points BCDE of the fluoro-ethylene carbonate/propylene carbonate/ethylene carbonate three-component composition diagram shown in FIG. 7 of the drawings, wherein the relative proportions of fluoro-ethylene carbonate, propylene carbonate and ethylene carbonate, respectively, are, 0.20, 0.79, 0.01 for point B, 0.10, 0.80, 0.10 for point C, 0.05, 0.475, 0.475 for point D, and 0.01, 0.01, 0.98 for point E, and the sum of said relative proportions being equal to 1.00.

14. A secondary alkali metal-ion cell according to claim 10, wherein the source of alkali metal-ions is provided by the electrochemically active material having the alkali metal-ions incorporated therein.

15. A secondary alkali metal-ion cell according to claim 10, wherein the source of alkali metal-ions is provided on assembly of the secondary cell, by means selected from the group consisting of a sheet of alkali metal in contact with the anode, in the carbonaceous material having alkali metal-ions incorporated therein, and in the electrolyte.

16. A cell according to claim 10, wherein the carbonaceous material has a degree of graphitization (g) of 0.40 to 1.0, as determined by the equation:

$$g=(3.45-d_{002})/0.085$$

wherein $d_{002}$ represents the spacing (A) between the graphitic layers in the crystal structure of the carbonaceous material, said carbonaceous material being capable of having alkali metal-ions reversibly incorporated therein.

17. A secondary alkali metal-ion cell according to claim 16, wherein the carbonaceous material is selected from the group consisting of synthetic graphite, natural graphite, isotropic graphite, carbon fibre, pyrolytic carbon and chemically modified carbon.

18. A secondary alkali metal-ion cell according to claim 14, wherein the electrochemically active material having the alkali metal-ions incorporated therein is selected from the group consisting of alkali metal oxides and alkali metal sulphides of nickel, cobalt, tin, manganese, iron, chromium, titanium, vanadium, molybdenum and mixtures thereof.

19. A secondary alkali metal-ion cell according to claim 16, wherein the alkali metal is lithium.

20. A cell according to claim 17, wherein the degree of graphitization (g) of the carbonaceous material is about 1.0.

21. A cell according to claim 10, wherein the cathode material is $LiCoO_2$.

22. A cell according to claim 18, wherein the electrochemically active material is $LiCoO_2$.

* * * * *